(12) United States Patent
Endo (10) Patent No.: US 11,780,364 B2
(45) Date of Patent: Oct. 10, 2023

(54) VEHICLE MARKER

(71) Applicant: KOITO MANUFACTURING CO., LTD., Tokyo (JP)

(72) Inventor: Yoshihisa Endo, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 83 days.

(21) Appl. No.: 17/481,433

(22) Filed: Sep. 22, 2021

(65) Prior Publication Data
US 2022/0001795 A1  Jan. 6, 2022

Related U.S. Application Data

(63) Continuation of application No. PCT/JP2020/008925, filed on Mar. 3, 2020.

(30) Foreign Application Priority Data

Mar. 26, 2019 (JP) ................................ 2019-058302

(51) Int. Cl.
*B60Q 1/50* (2006.01)
*B60Q 1/32* (2006.01)

(52) U.S. Cl.
CPC ............. *B60Q 1/323* (2013.01); *B60Q 1/507* (2022.05); *B60Q 1/543* (2022.05); *B60Q 2900/50* (2022.05)

(58) Field of Classification Search
CPC .......... B60Q 1/50; B60Q 1/507; B60Q 1/543; B60Q 2900/50; B60Q 1/323; G08G 1/16
See application file for complete search history.

(56) References Cited

U.S. PATENT DOCUMENTS

| 4,908,500 A | 3/1990 | Baumberger |
| 10,800,414 B2 * | 10/2020 | Kleinau ............ G08G 1/09675 |
| 2011/0098855 A1 | 4/2011 | Kurth et al. |
| 2012/0320206 A1 | 12/2012 | Sim et al. |
| 2019/0001818 A1 * | 1/2019 | Sakata .................. B60Q 1/503 |

(Continued)

FOREIGN PATENT DOCUMENTS

| CN | 104167101 A | 11/2014 |
| DE | 102008002274 A1 | 12/2009 |

(Continued)

OTHER PUBLICATIONS

Extended European Search Report dated May 2, 2022, issued in corresponding European Application No. 20779425.6. (8 pages).

(Continued)

*Primary Examiner* — Omeed Alizada
(74) *Attorney, Agent, or Firm* — BUCHANAN INGERSOLL & ROONEY PC (57) ABSTRACT

A first marker group is mounted on a front face of a vehicle. A second marker group MG2 is mounted on a rear face of the vehicle. A third marker group is mounted on a left-side face of the vehicle. A fourth marker group is mounted on a right-side face of the vehicle. Each marker group includes at least one marker. Each marker is designed to have at least one from among the shape, spatial pattern, temporal pattern, color, reflection ratio, luminance, and layout defined so as to allow a sensing system mounted on another vehicle to acquire information with respect to the vehicle in the sensing operation thereof.

10 Claims, 8 Drawing Sheets

(56) References Cited

U.S. PATENT DOCUMENTS

| | | | |
|---|---|---|---|
| 2019/0241119 A1* | 8/2019 | Takeda | B60Q 1/46 |
| 2019/0359131 A1 | 11/2019 | Wama et al. | |

FOREIGN PATENT DOCUMENTS

| | | | |
|---|---|---|---|
| DE | 102013002875 A1 | 9/2014 | |
| DE | 102015208094 A1 | 11/2016 | |
| EP | 2626243 A1 | 8/2013 | |
| EP | 3718827 A1 | 10/2020 | |
| FR | 2893172 A1 | 5/2007 | |
| JP | S63-191287 A | 8/1988 | |
| JP | S64-033698 A | 2/1989 | |
| JP | H0776245 A | 3/1995 | |
| JP | H09-269827 A | 10/1997 | |
| JP | 2001-199340 A | 7/2001 | |
| JP | 2005125829 A | 5/2005 | |
| JP | 2006213235 A | 8/2006 | |
| JP | 2010013080 A | 1/2010 | |
| JP | 2013-164913 A | 8/2013 | |
| JP | 2018-086913 A | 6/2018 | |
| WO | 2017/079349 A1 | 5/2017 | |
| WO | WO-2017079349 A1 * | 5/2017 | B60L 3/0007 |
| WO | 2018/056372 A1 | 3/2018 | |

OTHER PUBLICATIONS

Office Action dated Sep. 2, 2022, in corresponding Chinese Patent Application No. 202080023847.5 and English translation of the Office Action. (25 pages).

International Search Report (Form PCT/ISA/210) dated Jun. 2, 2020, in the corresponding International Application No. PCT/JP2020/008925. (4 pages).

International Preliminary Report on Patentability (Form PCT/IB/373) and the Written Opinion of the International Searching Authority (Form PCT/ISA/237) dated Sep. 28, 2021, in the corresponding International Applicatior No. PCT/JP2020/008925. (10 pages).

Office Action dated Apr. 26, 2023, in corresponding Chinese Patent Application No. 202080023847.5 and English translation of the Office Action. (14 pages).

Office Action (Notification of Reason(s) for Refusal) dated Jun. 13, 2023, in corresponding Japanese Patent Application No. 2021-508892 and English translation of the Office Action. (3 pages).

* cited by examiner

VEHICLE MARKER

BACKGROUND

1. Technical Field

The present disclosure relates to a marker for conveyances.

2. Description of the Related Art

In order to support autonomous driving or autonomous control of the light distribution of a headlamp, an object identification system is employed for sensing the position and the kind of an object that exists in the vicinity of a vehicle. The object identification system includes a sensor and a processing device configured to analyze the output of the sensor. The processing device is implemented based on a prediction model generated by machine learning.

As such a sensor, a suitable one is selected from among a visible-light camera, infrared camera, LiDAR (Light Detection and Ranging, Laser Imaging Detection and Ranging), millimeter-wave radar, ultrasonic sonar, etc., giving consideration to the usage, required precision, and cost.

Main detection targets to be detected by the object identification system are vehicles such as automobiles, trucks, buses, etc. The object identification system that is capable of detecting and identifying the kind of an object (vehicle, pedestrian, traffic sign, etc.) can be implemented in a relatively simple manner based on image processing and machine learning.

In contrast, it is difficult for such a conventional architecture to detect the orientation (traveling direction), relative distance, body size, etc. of a vehicle, which are useful information that can be used to predict the actions of the said vehicle, due to restrictions on the amount of processing or the like.

SUMMARY

The present disclosure has been made in view of such a situation. Accordingly, it is an exemplary purpose of an embodiment of the present disclosure to provide a conveyance that is capable of presenting useful information that can be used to predict the action of the conveyance itself and useful information for autonomous driving to another conveyance.

An embodiment of the present disclosure relates to a conveyance. The conveyance includes: a first marker group attached to a front face of the conveyance; a second marker group attached to a rear face of the conveyance; a third marker group attached to a left-side face of the conveyance; and a fourth marker group attached to a right-side face of the conveyance. The first marker group through the fourth marker group each include at least one marker having at least one from among the shape, spatial pattern, temporal pattern, color, reflection ratio, luminance, and layout so as to allow a sensing system mounted on another conveyance to acquire information with respect to the conveyance in a sensing operation of the sensing system.

Another embodiment of the present disclosure also relates to a conveyance. The conveyance is provided with multiple markers having at least one from among the shape, spatial pattern, temporal pattern, color, luminance, and layout defined to allow another conveyance to identify the traveling direction or forward movement direction regardless of the direction from which the other conveyance views the vehicle.

Yet another embodiment of the present disclosure relates to a conveyance marker. The conveyance marker can be mounted on a conveyance. The conveyance is structured to have a front-rear symmetrical body, and is capable of traveling in both the forward direction and the backward direction. The conveyance marker includes a display device, and a controller structured to control the display of the display device according to the state of the conveyance.

It should be noted that any combination of the components described above or any manifestation thereof may be mutually substituted between a method, apparatus, system, and so forth, which are also effective as an embodiment of the present disclosure.

DETAILED DESCRIPTION

Embodiments will now be described, by way of example only, with reference to the accompanying drawings which are meant to be exemplary, not limiting, and wherein like elements are numbered alike in several Figures, in which.

DETAILED DESCRIPTION

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "one embodiment" may be used herein to refer to a single embodiment or multiple embodiments of the disclosure.

One embodiment disclosed in the present specification relates to a conveyance. The conveyance includes: a first marker group attached to a front face of the conveyance; a second marker group attached to a rear face of the conveyance; a third marker group attached to a left-side face of the conveyance; and a fourth marker group attached to a right-side face of the conveyance. The first marker group through the fourth marker group each include at least one marker having at least one from among the shape, spatial pattern, temporal pattern, color, reflection ratio, luminance, and layout so as to allow a sensing system mounted on another conveyance to acquire information with respect to the conveyance in a sensing operation of the sensing system.

With such an arrangement in which the marker group is sensed by the sensing system of the other conveyance, this allows the other conveyance to be notified of the state of the said conveyance. This allows the other conveyance to predict the action of the said conveyance in a simple manner.

In one embodiment, the information with respect to the conveyance may include the forward movement direction or traveling direction of the said conveyance. The "forward movement direction" represents the forward direction of a vehicle having distinguishable front and rear sides. The reverse direction thereof is represented by the "backward movement direction". In a case in which the information with respect to the said conveyance includes the "forward movement direction", this allows the other conveyance to be notified of the orientation of the said conveyance.

In a case in which the information with respect to the said conveyance includes the "forward movement direction", this allows the other conveyance to be notified of the direction in which the said conveyance actually moves regardless of the orientation of the said conveyance.

In one embodiment, the information with respect to the conveyance may include the body size of the conveyance. This allows the other conveyance to give consideration to the body size when passing or overtaking the said conveyance.

In one embodiment, the information with respect to the said conveyance may include information required for the other conveyance to estimate the distance to the said conveyance.

In one embodiment, the marker may include a display device that is capable of changing at least one from among the shape, spatial pattern, temporal pattern, luminance, and layout.

In one embodiment, the conveyance may be structured to have a front-rear symmetry body, and to be capable of traveling in both the forward direction and the backward direction. The display of the display device may be dynamically changed according to the traveling direction.

In one embodiment, the marker may include a one-dimensional or two-dimensional code. Also, the code may include information with respect to the position where the marker is attached.

In one embodiment, the code may include information with respect to the body size of the conveyance to which the marker is attached.

In one embodiment, the code may include information with respect to the identification number of the conveyance to which the marker is attached.

In one embodiment, the marker group may include a pair of markers arranged at a predetermined interval in a predetermined direction. In this case, the sensing system of the other conveyance is able to estimate the distance between the said conveyance and the other conveyance based on trigonometry or the like.

EMBODIMENTS

Description will be made below regarding the present disclosure based on preferred embodiments with reference to the drawings. The embodiments have been described for exemplary purposes only, and are by no means intended to restrict the present disclosure. Also, it is not necessarily essential for the present disclosure that all the features or a combination thereof be provided as described in the embodiments. The same or similar components, members, and processes are denoted by the same reference numerals, and redundant description thereof will be omitted as appropriate.

Embodiment 1

Figure 1:
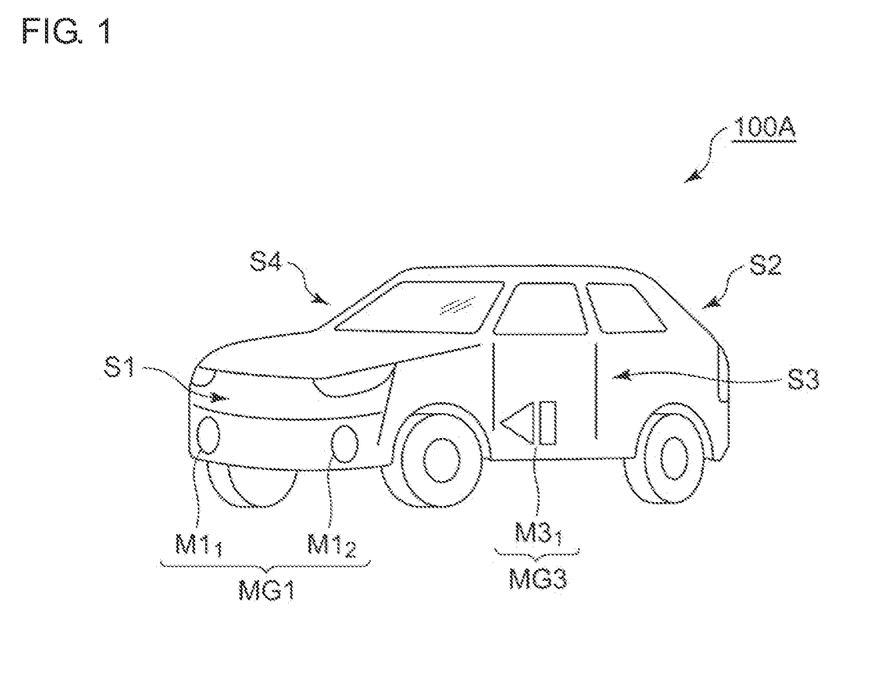
FIG. 1 is a perspective diagram showing a vehicle according to an embodiment 1.

FIG. 1 is a perspective view of a vehicle 100A according to an embodiment 1. Description will be made in this embodiment regarding an example in which the vehicle 100A is configured as an automobile. The vehicle 100A is provided with a first marker group MG1 through a fourth marker group MG4. The first marker group MG1 is mounted on the front face S1 of the automobile 100A. The second marker group MG2 is mounted on the rear face S2 of the vehicle 100A. The third marker group MG3 is mounted on the left-side face S3 of the vehicle 100A. The fourth marker group MG4 is mounted on the right-side face S4 of the vehicle 100A. FIG. 1 explicitly shows the front face S1, the first marker group MG1 mounted on the front face S1, the left-side face S3, and the third marker group MG3 mounted on the left-side face S3.

For example, the front face S1 may include a front bumper, front grille, hood, front window, headlamp, or a part of the roof as can be seen from the front side. Also, the rear face S2 may include a rear bumper, trunk lid, rear window, rear taillight, or a part of the roof as can be seen from the front side.

Each marker group MG # (#=1 to 4) includes at least one marker M #. The k markers that form a given marker group MG # will be represented by "M $\#_1$ through M $\#_k$". The markers M $\#_1$ through M $\#_k$ that form a given marker group MG # are designed to define at least one from among the (i) shape, (ii) spatial pattern, (iii) temporal pattern, (iv) color, (v) reflection ratio, (vi) luminance, and (vii) layout, such that a sensing system mounted on another vehicle is able to sense the face S # that mounts the marker group MG # so as to acquire information with respect to the vehicle 100A itself. The information with respect to (i) through (vii) will be collectively referred to as the "shape, etc." hereafter.

Specifically, the relation between the information with respect to the vehicle 100A and the shape, etc. of the markers is standardized such that it is common to all vehicles.

Figure 2A:
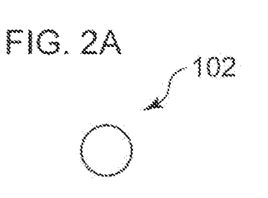
FIGS. 2A through 2C are diagrams each showing an example of the kind of the marker.
Figure 2B:
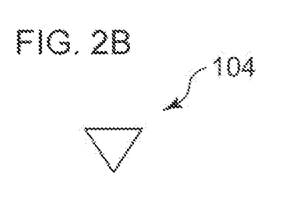
Figure 2C:
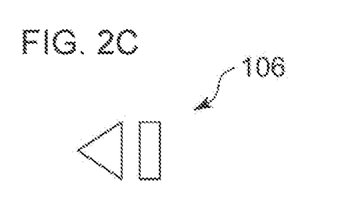

FIGS. 2A through 2C are diagrams each showing an example of the kind of the markers. In the present embodiment, the markers are defined such that the forward movement direction of the vehicle mounting the markers can be detected. FIG. 2A shows a front-side dedicated mark 102. FIG. 2B shows a rear-side dedicated mark 104. FIG. 2C shows a forward movement direction mark 106. In this example, the kind and function of the marker are associated with the shape of the marker. The marker may be a light-emitting member that emits light in a predetermined color (active marker). Alternatively, the marker may be configured as a reflector (absorber) having a reflection ratio with respect to a predetermined wavelength (e.g., infrared wavelength) that is higher (or lower) than that of the portions other than the marker (passive marker). It is sufficient for the marker to be detectable by a sensing system of another vehicle. That is to say, there is no requirement for the marker to be detectable by human vision.

Figure 3A:
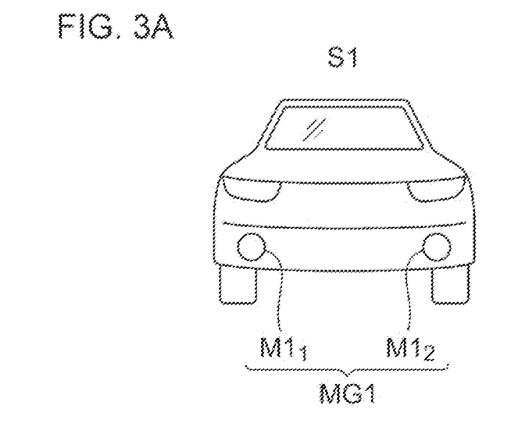
FIGS. 3A through 3D are diagrams each showing a vehicle to which the markers shown in FIGS. 2A through 2C are added.

FIGS. 3A through 3D are diagrams showing a vehicle mounting the markers shown in FIGS. 2A through 2C. FIGS. 3A through 3D show the first marker group MG1 through the fourth marker group MG4. As shown in FIG. 3A, the first marker group MG1 mounted on the front face S1 includes two markers $M1_1$ and $M1_2$. The markers $M1_1$ and $M1_2$ are each configured as the front-side dedicated mark 102 shown in FIG. 2A.

The two markers $M1_1$ and $M1_2$ are arranged at a predetermined distance apart from each other (e.g., 1.5 m). This allows the sensing system of another vehicle to sense the said vehicle so as to estimate the distance between the sensing system and the said vehicle based on trigonometry or the like.

Figure 3B:
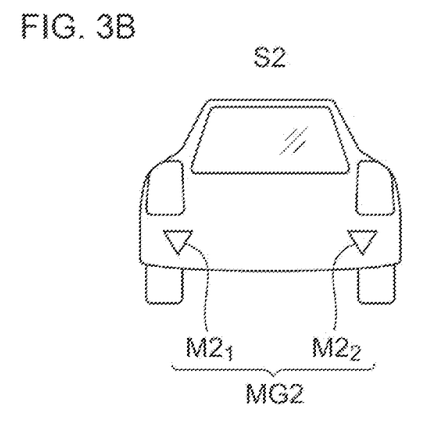

As shown in FIG. 3B, the second marker group MG2 mounted on the rear face S2 includes two markers $M2_1$ and $M2_2$, which are each configured as the rear-side dedicated mark 104 shown in FIG. 2B. As with the front-side dedicated marker, the two rear-side dedicated markers $M2_1$ and $M2_2$ are arranged at a predetermined distance apart from each other (e.g., 1.5 m). This allows the sensing system of another vehicle to sense the said vehicle so as to estimate the distance between the sensing system and the said vehicle based on trigonometry or the like.

Figure 3C:
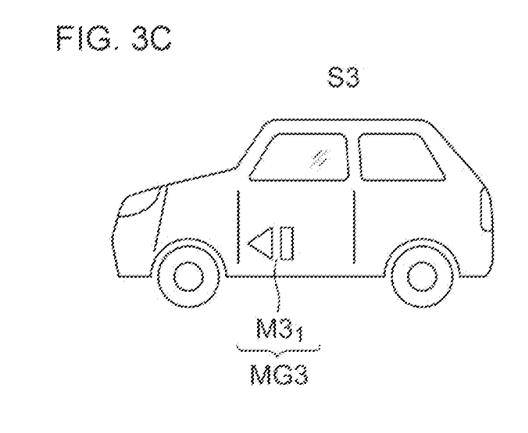
Figure 3D:
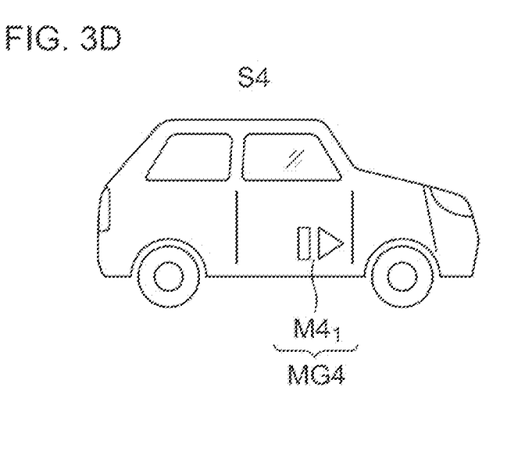

As shown in FIG. 3C, the third marker group MG3 mounted on the left-side face S3 includes a single marker $M3_1$ configured as the forward movement direction mark 106. The fourth marker group MG4 mounted on the right-side face S4 shown in FIG. 3D has the same structure as that on the left-side face.

The sensing system mounted on another vehicle is capable of analyzing the shape or position of the marker so as to detect the forward movement direction of the vehicle to which the marker is attached. This allows the action of the vehicle to be predicted, and this prediction of the action can be used for autonomous driving or light distribution control.

Figure 4A:
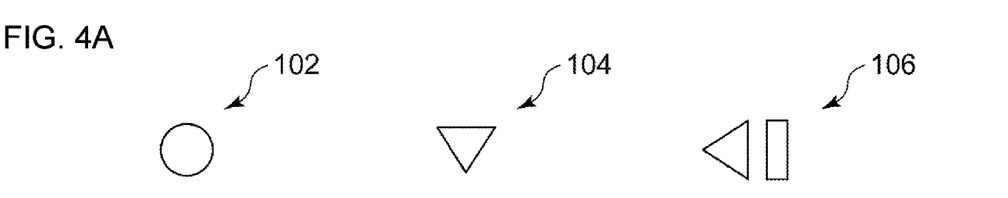
FIGS. 4A and 4B are diagrams showing the markers defined for each body size.
Figure 4B:
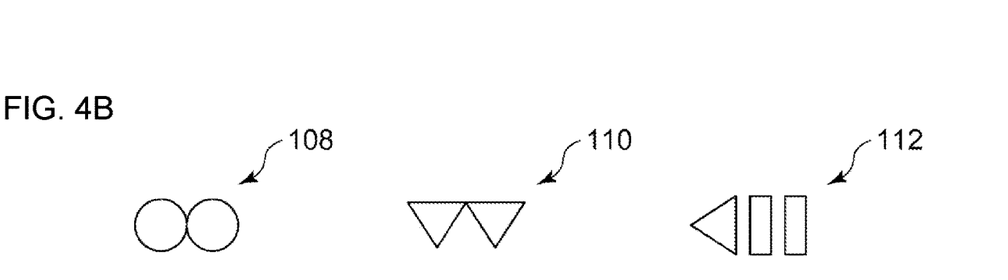

The marker may include information with respect to the body size. Specifically, the marker may be designed with a different shape for each body size. FIGS. 4A and 4B are diagrams showing markers designed for each body size. FIG. 4A shows the markers designed to be attached to a standard-size vehicle, and FIG. 4B shows the markers designed to be attached to a large-size vehicle. The body size may be defined in more detail.

The markers 102, 104, and 106 shown in FIG. 4A are the same as those shown in FIGS. 2A through 2C. FIG. 4B shows a front-side dedicated mark 108, rear-side dedicated mark 110, and forward movement direction mark 112 for a large-size vehicle.

Figure 5A:
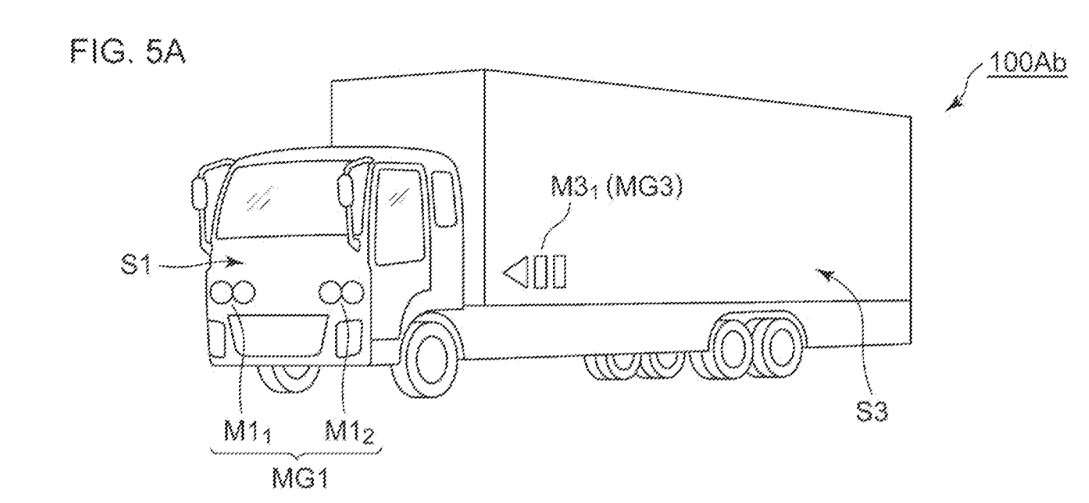
FIGS. 5A and 5B are diagrams each showing a large-size vehicle to which the markers shown in FIG. 4B are added.
Figure 5B:
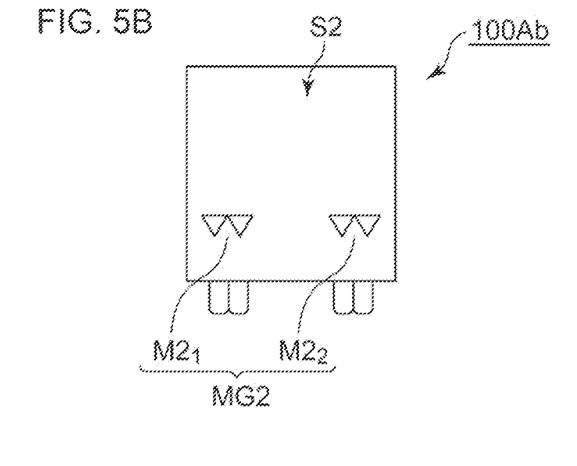

FIGS. 5A and 5B are diagrams each showing a large-size vehicle 100Ab to which the markers shown in FIG. 4B are attached. FIG. 5A shows the front face S1 and the left-side face S3. The first marker group MG1 attached to the front face S1 includes two markers $M1_1$ and $M1_2$, which are each configured as the front-side dedicated mark 108 for a large-size vehicle. The third marker group MG3 attached to the left-side face S3 includes a single marker $M3_1$ which is configured as the forward movement direction mark 112 for a large-size vehicle. FIG. 5B shows the rear face S2. The second marker group MG2 attached to the rear face S2 includes two markers $M2_1$ and $M2_2$, which are each configured as the rear-side dedicated mark 110 for a large-size vehicle.

As described above, with such an arrangement in which the markers are designed with a shape etc. of the marker that allows the body size of the vehicle to be distinguished, this allows the sensing system of other vehicles to predict the action of the vehicle to which the markers are attached with improved accuracy.

Figure 6:
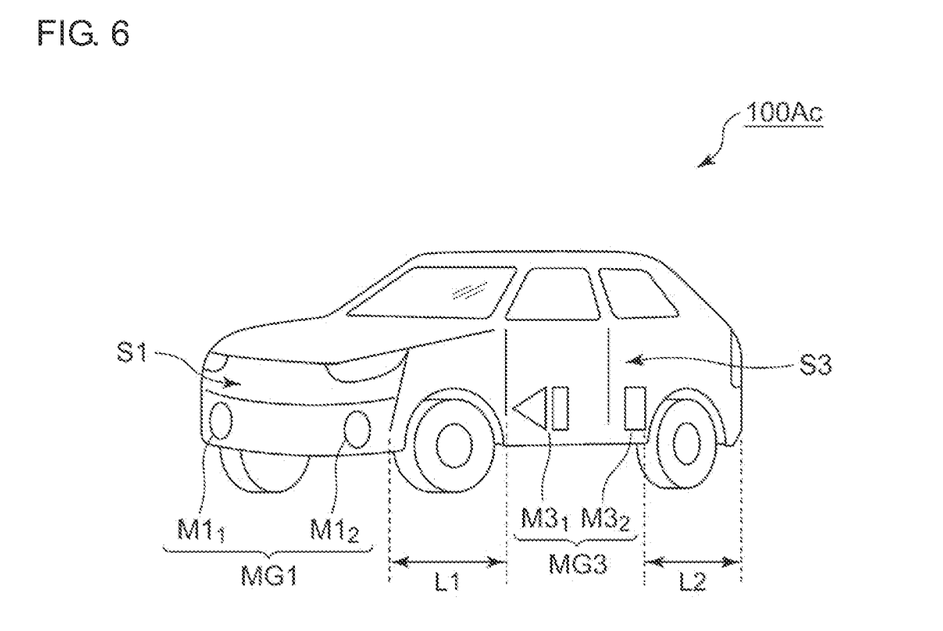
FIG. 6 is a diagram showing a third marker group including two marks.

The third marker group MG3 on the left-side face S3 and the fourth marker group MG4 on the right-side face S4 may each include two markers. FIG. 6 is a diagram showing the third marker group MG3 including two markers $M3_1$ and $M3_2$. The marker $M3_1$ is configured as the forward movement direction mark 106, and is mounted at a position a predetermined distance $L_1$ (e.g., 1.5 m) from the front edge. The marker $M3_2$ is mounted at a position a predetermined distance $L_2$ (e.g., 1.5 m) from the rear edge. With this, the traveling direction of the vehicle 100Ac can be detected based on the marker $M3_1$. Furthermore, the length of the vehicle 100Ac can be detected based on the distance between the markers $M3_1$ and $M3_2$.

Embodiment 2

Figure 7:
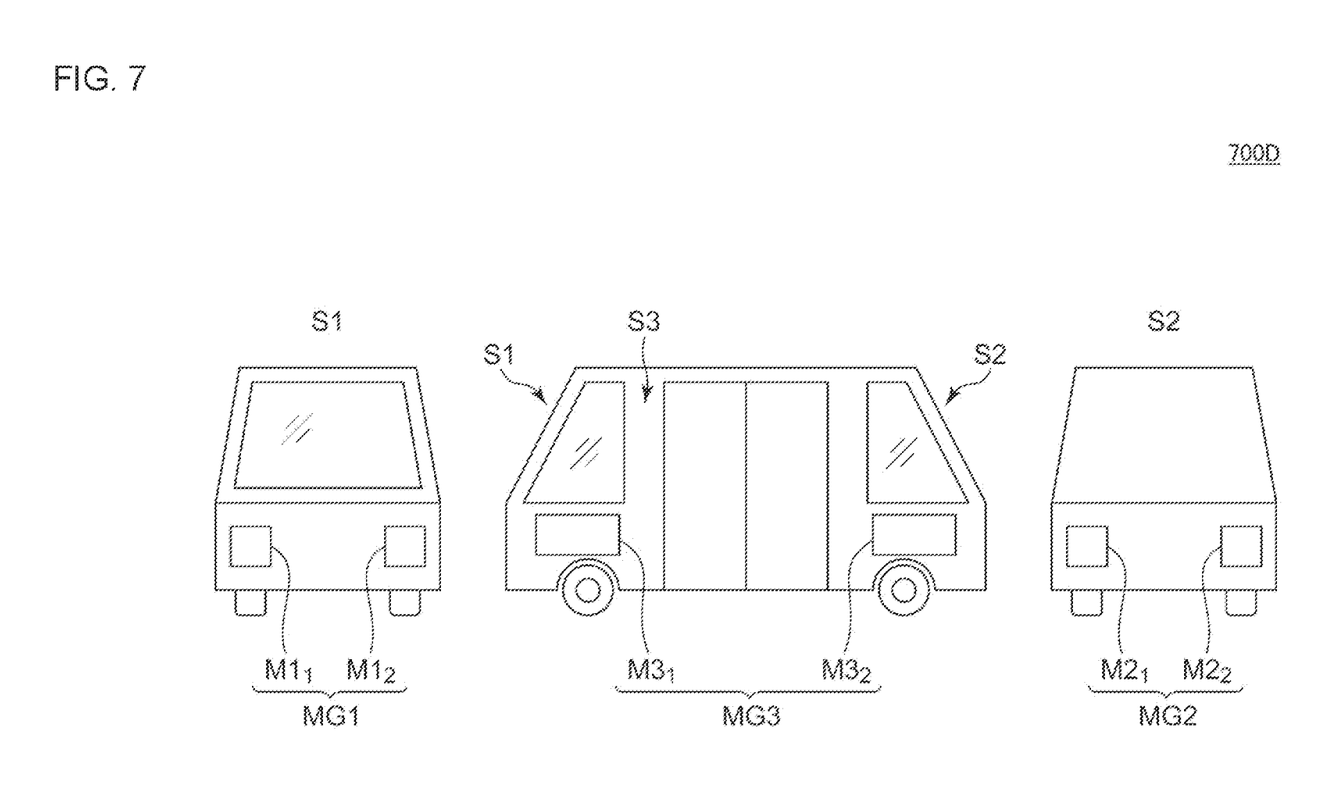
FIG. 7 is a diagram showing a vehicle according to an embodiment 2.

FIG. 7 is a diagram showing a vehicle 100D according to an embodiment 2. The vehicle 100D has a front-rear symmetrical body, and is capable of traveling in both the forward direction and the backward direction. From the external appearance, the front side and the rear side are indistinguishable. In other words, the traveling direction is unknown. For descriptive purposes, the front face S1, the rear face S2, and the left-side face S3 (right-side face S4) are defined as shown in the drawings. The front face S1, the rear face S2, the left-side face S3, and the right-side face S4 are provided with the first marker group MG1 through the fourth marker group MG4, respectively.

Figure 8:
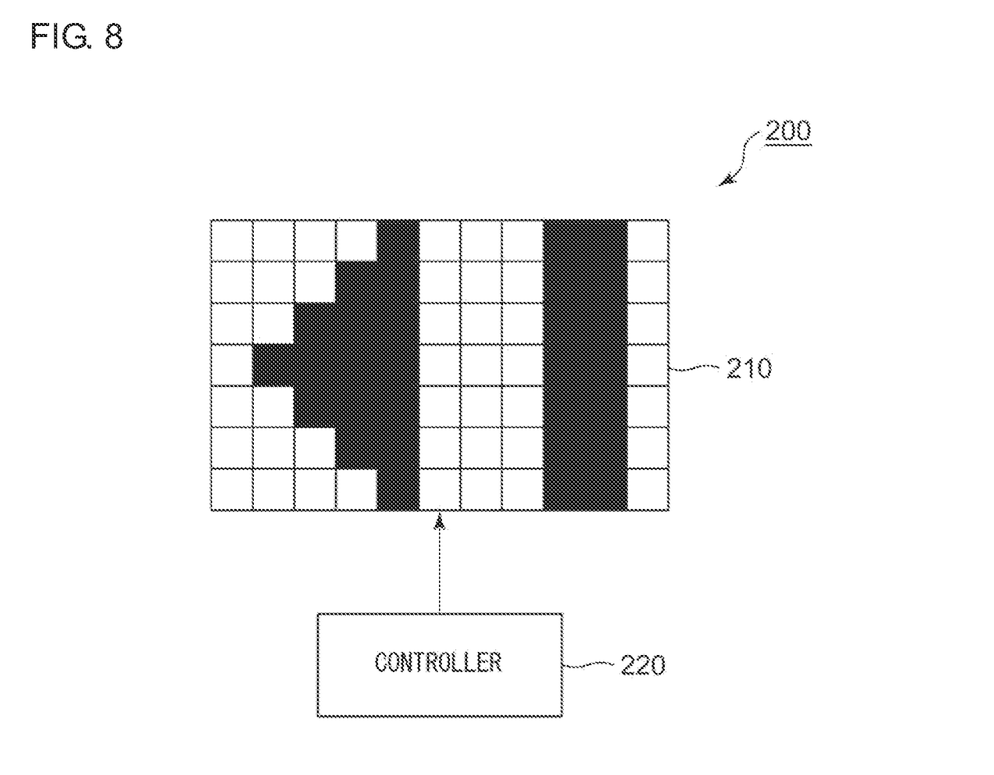
FIG. 8 is a block diagram showing a marker that forms a marker group MG #.

FIG. 8 is a block diagram showing a display-type marker 200 that forms the marker group MG #. The marker 200 includes a display device 210 and a controller 220 thereof. The display device 210 is configured as an array of multiple light-emitting elements arranged in a one-dimensional manner or a two-dimensional manner. The multiple light-emitting elements each turn on and off, thereby allowing the display device 210 to control the shape to be displayed. The controller 220 controls the display operation of the display device 210 according to the state of the vehicle 100D. The state of the vehicle 100D may be the traveling direction of the vehicle 100D.

Figure 9A:
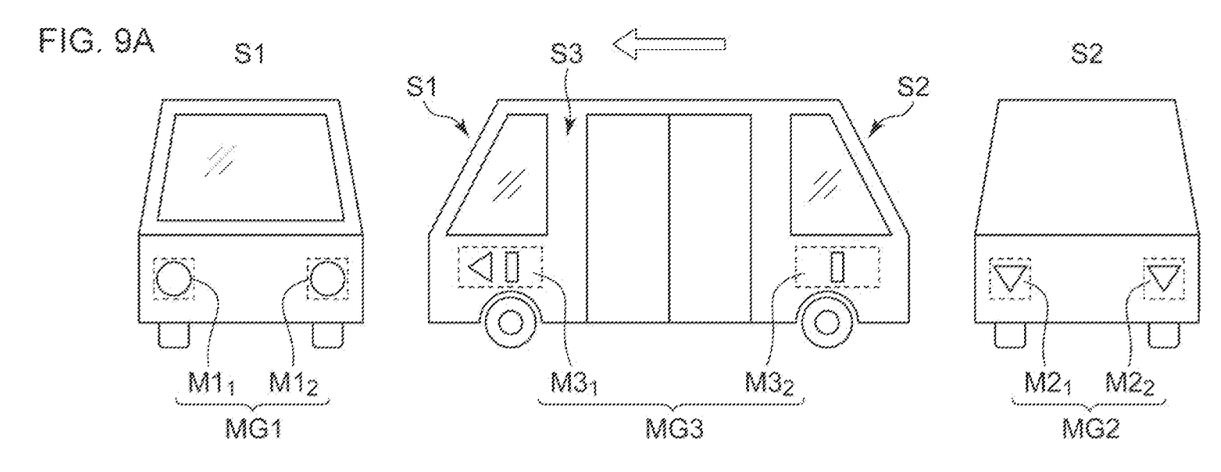
FIGS. 9A and 9B are diagrams for explaining the operation of the vehicle shown in FIG. 7.

The above is the configuration of the vehicle 100D. Next, description will be made regarding the operation of the vehicle 100D. FIGS. 9A and 9B are diagrams for explaining the operation of the vehicle 100D shown in FIG. 7. FIG. 9A shows a state in which the vehicle 100D moves in the left direction in the drawing. The markers $M1_1$ and $M1_2$ of the first marker group MG1 each display the front-side dedicated mark 102. The markers $M2_1$ and $M2_2$ of the second marker group MG2 each display the rear-side dedicated mark 104. Furthermore, the marker $M3_1$ of the third marker group MG3 displays the forward movement direction mark 106 such that it faces the left direction. The marker $M3_1$ is arranged at a position a predetermined distance from the front end of the vehicle 100D. The marker $M3_2$ indicates a position a predetermined distance from the rear end of the vehicle 100D.

Figure 9B:
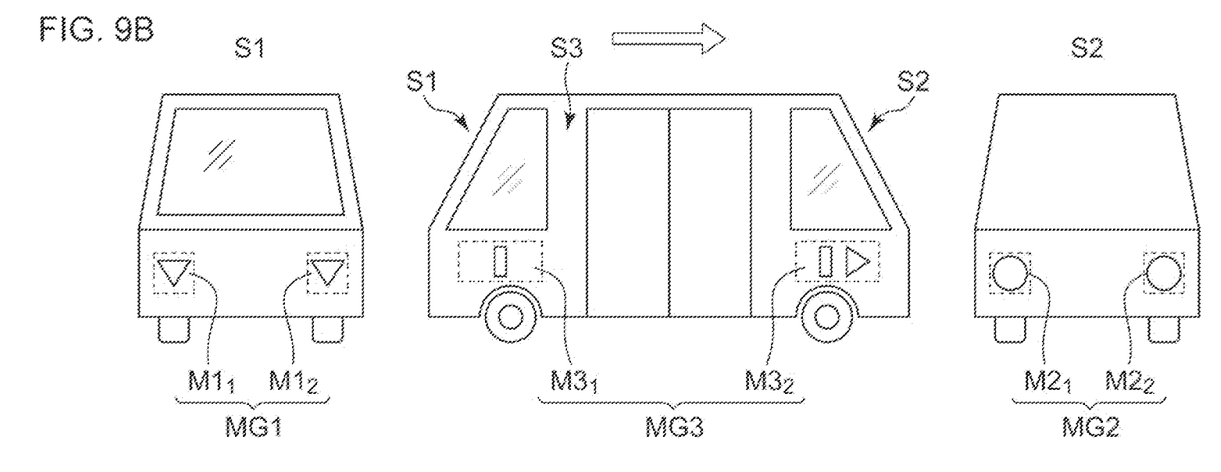

FIG. 9B shows a state in which the vehicle 100D moves in the right direction in the drawing. The markers $M1_1$ and $M1_2$ of the first marker group MG1 each display the rear-side dedicated mark 104. The markers $M2_1$ and $M2_2$ of the second marker group MG2 each display the front-side dedicated mark 102. Furthermore, the marker $M3_2$ of the third marker group MG3 displays the forward movement direction mark 106 such that it faces the right direction. The marker $M3_2$ is arranged at a position a predetermined distance from the front end of the vehicle 100D. The marker $M3_1$ indicates a position a predetermined distance from the rear end of the vehicle 100D.

With the embodiment 2, the vehicle 700D allows traffic participants in the vicinity to be notified of the traveling direction of the vehicle 700D itself although the front side and the rear side of the vehicle 700D are indistinguishable.

Description has been made above regarding the present disclosure with reference to the embodiments. The above-described embodiments have been described for exemplary purposes only, and are by no means intended to be interpreted restrictively. Rather, it can be readily conceived by those skilled in this art that various modifications may be made by making various combinations of the aforementioned components or processes, which are also encompassed in the technical scope of the present disclosure. Description will be made below regarding such modifications.

First Modification

Description has been made in the embodiments regarding an arrangement in which the function and the kind of the marker are associated with the shape. However, the present disclosure is not restricted to such an arrangement. Also, the kind or the function of the marker may be defined such that it is associated with any one from among the marker shape, spatial pattern, color, reflection ratio, luminance, and layout, or a desired combination thereof.

For example, the marker may be configured as a set of multiple elements such as multiple dots, bars, or the like, or a set of cells or pixels. Also, the function or the kind of the marker may be defined such that it is associated with the spatial pattern of the marker thus configured. Examples of this embodiment include an array of the light-emitting elements (display) described above, and a one-dimensional or two-dimensional code described later.

Also, a color of the marker may be defined for each function or each kind. In this case, the markers may be configured in the same shape. Also, the markers may be configured in different shapes as described above.

Also, the reflection ratio of the marker may be defined for each function or each kind. In a case in which the marker is configured as a light source, the luminance of the marker may be defined for each function or each kind.

In a case in which the marker is configured as a light source, the marker may be turned on and off such that it blinks in a time-division manner. A temporal pattern of the blinking may be defined for each function or each kind.

Second Modification

The marker may include a one-dimensional code (e.g., barcode) or may include a two-dimensional code. In this case, the marker may have the same shape as viewed from a distance.

The code may include information with respect to the position at which the marker is attached. The "information with respect to the position" as used here may represent the face (one from among S1 through S4) to which the marker is attached. Also, the "information with respect to the position" may indicate the position on the face in addition to the face to which the marker is attached.

The code may include information with respect to the body size of the vehicle to which the marker is attached. The body size may be represented by a class such as "standard-size vehicle" or "large-size vehicle". Also, the body size may include information with respect to the overall length, overall width, and height of the vehicle.

The code may include information with respect to the identification number of the vehicle to which the marker is attached.

Third Modification

The display-type marker shown in FIG. 8 may be mounted on a vehicle that is asymmetrical in the front-rear direction as shown in FIG. 1. Also, in this case, the display of the marker may be changed according to the state of the vehicle. For example, the marker may indicate the traveling direction of the vehicle. That is to say, when the vehicle travels in the forward direction, the marker that indicates the forward direction of the vehicle may be displayed. Conversely, when the vehicle travels in the backward direction, the marker that indicates the backward direction of the vehicle may be displayed.

Description has been made in the embodiment regarding an example in which the vehicle is configured as an automobile. However, the present disclosure is applicable to bicycles and motorcycles. Also, the present disclosure is widely applicable to various kinds of conveyances other than the category of vehicles.

Description has been made regarding the present disclosure with reference to the embodiments using specific terms. However, the above-described embodiments show only an aspect of the mechanisms and applications of the present disclosure. Rather, various modifications and various changes in the layout can be made without departing from the spirit and scope of the present invention defined in appended claims.

What is claimed is:

1. A conveyance comprising:
    a first marker group attached to a front face of the conveyance;
    a second marker group attached to a rear face of the conveyance;
    a third marker group attached to a left-side face of the conveyance; and
    a fourth marker group attached to a right-side face of the conveyance,
    wherein the first marker group through the fourth marker group each comprises at least one marker indicative of information with respect to the conveyance, and
    wherein at least one of a shape, spatial pattern, temporal pattern, color, reflection ratio, luminance, and layout of the at least one marker corresponds to a body size of the conveyance, so that a sensing system mounted on another conveyance can acquire the body size of the conveyance.

2. The conveyance according to claim 1, wherein the information with respect to the conveyance includes a forward movement direction or a traveling direction of the conveyance.

3. The conveyance according to claim 1, wherein the information with respect to the conveyance includes information required for the other conveyance to estimate a distance to the conveyance.

4. The conveyance according to claim 1, wherein the marker group comprises a pair of markers arranged at a predetermined interval in a predetermined direction.

5. The conveyance according to claim 1, wherein the marker comprises a display device that is capable of changing at least one from among a shape, spatial pattern, temporal pattern, luminance, and layout.

6. The conveyance according to claim 5, structured to have front-rear symmetry, and to be capable of traveling in both a forward direction and a backward direction,
    wherein a display of the display device is dynamically changed according to a traveling direction.

7. The conveyance according to claim 1, wherein the marker includes a one-dimensional or two-dimensional code.

8. The conveyance according to claim 7, wherein the code includes information with respect to a position where the marker is attached.

9. The conveyance according to claim 7, wherein the code includes information with respect to a body size of the conveyance to which the marker is attached.

10. The conveyance according to claim 7, wherein the code includes information with respect to an identification number of the conveyance to which the marker is attached.

\* \* \* \* \*